United States Patent
Eriksson et al.

(10) Patent No.: US 9,301,251 B2
(45) Date of Patent: Mar. 29, 2016

(54) METHODS, APPARATUS AND COMPUTER PROGRAMS FOR BASE STATION INITIATED ENERGY SAVINGS WITHIN AN ASSOCIATED USER EQUIPMENT

(75) Inventors: Jonas Eriksson, Linköping (SE); Pål Frenger, Linköping (SE); Erik Larsson, Linköping (SE); Reza Moosavi, Linköping (SE); Niclas Wiberg, Linköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 97 days.

(21) Appl. No.: 14/130,515

(22) PCT Filed: Jul. 5, 2011

(86) PCT No.: PCT/SE2011/050910
§ 371 (c)(1), (2), (4) Date: Jan. 2, 2014

(87) PCT Pub. No.: WO2013/006102
PCT Pub. Date: Jan. 10, 2013

(65) Prior Publication Data
US 2014/0119260 A1    May 1, 2014

(51) Int. Cl.
H04W 52/02    (2009.01)
H04W 76/04    (2009.01)

(52) U.S. Cl.
CPC ........ *H04W 52/0206* (2013.01); *H04W 76/048* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 6,359,872 | B1 * | 3/2002 | Mahany et al. | 370/338 |
| 6,654,378 | B1 * | 11/2003 | Mahany et al. | 370/401 |
| 2007/0202835 | A1 * | 8/2007 | Son et al. | 455/343.1 |
| 2009/0161587 | A1 * | 6/2009 | Ishii et al. | 370/311 |
| 2010/0167792 | A1 * | 7/2010 | Chen et al. | 455/566 |
| 2010/0195548 | A1 * | 8/2010 | Navda et al. | 370/311 |
| 2011/0007681 | A1 * | 1/2011 | Park et al. | 370/311 |
| 2011/0038275 | A1 * | 2/2011 | Kim et al. | 370/252 |
| 2011/0044220 | A1 * | 2/2011 | Park et al. | 370/311 |
| 2011/0070928 | A1 * | 3/2011 | Hsu et al. | 455/574 |
| 2011/0116427 | A1 * | 5/2011 | Chang et al. | 370/311 |

FOREIGN PATENT DOCUMENTS

| | | |
|---|---|---|
| EP | 2076081 A1 | 7/2009 |
| WO | 2007013934 A2 | 2/2007 |
| WO | 2009040748 A2 | 4/2009 |

OTHER PUBLICATIONS

Yang, et al., "Modeling UMTS Power Saving with Bursty Packet Data Traffic", IEE Transactions on Mobile Computing, Dec. 1, 2007, vol. 6, No. 12, manuscript published online Apr. 25, 2007, pp. 1398-1409, IEEE Computer Society.

* cited by examiner

*Primary Examiner* — Kerri Rose
(74) *Attorney, Agent, or Firm* — Coats & Bennett, PLLC

(57) ABSTRACT

The invention relates to a method 10 in a base station 2 of a communication system 1 comprising one or more user equipment 4. The method 10 comprises the steps of: detecting 11 that no control transmission or data transmission is being prepared for the one or more user equipment 4; and transmitting 12 a downlink inactivity indicator to the one or more user equipment 4. The invention also encompasses methods in a user equipment, computer programs, and computer program products.

12 Claims, 4 Drawing Sheets

METHODS, APPARATUS AND COMPUTER PROGRAMS FOR BASE STATION INITIATED ENERGY SAVINGS WITHIN AN ASSOCIATED USER EQUIPMENT

FIELD OF THE INVENTION

The invention relates generally to the field of energy efficiency within radio communication systems, and in particular to energy saving within user equipment and base stations of such radio communication systems.

BACKGROUND OF THE INVENTION

In packet-oriented mobile communication systems such as 3GPP Long Term Evolution (LTE) and High Speed Packet Access (HSPA), a terminal must repeatedly monitor the transmitted downlink signals to see whether there are any transmissions directed to the terminal. A downlink transmission comprises a control message and a data packet, where the control message indicates the presence of the data packet as well as variable formatting details that are needed for receiving the data packet. The control message can also have a variable formatting, and the terminal typically has to search through a list of possible formatting alternatives of the control message, and for each control message candidate, try to decode it. If a control message is found, the terminal tries to receive the data packet using the formatting details from the control message. If no control message is found, the terminal can disable its receiving circuitry until the next opportunity to receive a downlink transmission, thereby saving processing power.

In the case of LTE, the control message is called Downlink Control Information (DCI) and is transmitted over the Physical Downlink Control Channel (PDCCH), while the data packet is transmitted over the Physical Downlink Shared Channel (PDSCH). Transmission opportunities occur with a period of 1 ms, called subframes.

Searching for the control messages takes time. This means that the terminal does not know immediately whether it will receive a data packet or not; the terminal does not know it until it has found a DCI specific for it. Therefore, the terminal has to continue receiving and buffering the radio signal after having received the control transmission, in case it finds a control message within the control transmission that indicates that there is a downlink data transmission intended for it. In many scenarios with low to moderate load, a majority of the transmission opportunities are unused, in the sense that there are no control messages and no data transmissions to be found. Still, all active terminals have to spend considerable resources in receiving and buffering the radio signals, and searching for control messages.

In LTE the terminal does not know the exact location of the PDCCH within a downlink control region. A PDCCH may consist of 1, 2, 4, or 8 control channel elements (CCEs) that each contains 36 resource elements. Each PDCCH supports multiple formats and the format used is a priori unknown to the terminal. A scheduler of a base station dynamically decides both the PDCCH format as well as which CCEs that shall be used when transmitting a DCI message to a terminal. To impose as few restrictions as possible on the scheduler while still reducing the maximum number of blind decoding attempts required by the terminal to find the PDCCH, LTE defines so-called search spaces which describe the set of CCEs that the terminal is supposed to monitor. In order for a certain terminal to determine that there is no PDCCH inside the downlink control region intended for it, the terminal needs to try all combinations in the search space and check that no one can be decoded.

It is important to minimize the power consumption of the terminal, offering the user a terminal with as long battery life time as possible. FIG. 1 illustrates an example of energy consumption of a terminal in idle mode when nothing is transmitted. For many terminals the energy consumption in the receiving parts will be dominating simply because the terminal does not transmit very often. It can be seen in FIG. 1 that the receiver (RX) radio front-end is dominating and that it is particularly expensive, in terms of power consumption, for the terminal to have the RX front-end activated. Typically the terminal needs to activate the RX front-tend when receiving data, when listening for paging transmissions from the communication network, and when performing radio measurements. During the time the terminal searches through the search space for downlink control information the RX front-end needs to be active since the terminal must buffer the received signal in case it contains any data transmission for the terminal.

SUMMARY OF THE INVENTION

In view of the above, it is an object of the invention to provide a mechanism enabling decreased power consumption in a communication system, both in a user equipment and in a base station.

The object is according to a first aspect of the invention achieved by a method in a base station of a communication system comprising one or more user equipment. The method comprises the steps of detecting that no control transmission or data transmission is being prepared for the one or more user equipment; and transmitting a downlink inactivity indicator to the one or more user equipment.

By means of the invention, user equipment processing power is saved, and thereby the battery operation time thereof is increased. In particular, as the need for the user equipment to receive and buffer signals when listening for transmissions from the communication network is alleviated by reception of the inactivity indicator, battery saving of the user equipment is realized. Further, the overall energy consumption within the communication network may also be decreased. The base station can be arranged to transmit inactivity indicators selectively, for example avoiding such transmission when user equipment are in discontinuous reception mode.

The object is according to a second aspect of the invention achieved by a base station of a communication system comprising one or more user equipment. The base station comprises a controller arranged to detect that no control transmission or data transmission is being prepared for the one or more user equipment, and a transmitter arranged to transmit a downlink inactivity indicator upon the controller detecting that no control transmission or data transmission is being prepared.

The object is according to a third aspect of the invention achieved by a computer program for a base station of a communication system comprising one or more user equipment. The computer program comprises computer program code, which, when run on the base station, causes the base station to perform the steps of detecting that no control transmission or data transmission is being prepared for the one or more user equipment, and transmitting a downlink inactivity indicator to the one or more user equipment.

The object is according to a fourth aspect of the invention achieved by a computer program product comprising a computer program as above, and a computer readable means on which the computer program is stored.

The object is according to a fifth aspect of the invention achieved by a method performed in a user equipment associated with a communication system for enabling power saving, the user equipment comprising receiving circuitry and being performed during control channel reception. The method comprises the steps of receiving, from a base station, a downlink inactivity indicator, and disabling the receiving circuitry, thus entering a power saving mode.

The object is according to a sixth aspect of the invention achieved by a user equipment associated with a communication system. The user equipment comprises receiving circuitry arranged to receive, from a base station during control channel reception, a downlink inactivity indicator, and a controller arranged to disable, upon reception of such downlink inactivity indicator, the receiving circuitry, thus entering a power saving mode.

The object is according to a seventh aspect of the invention achieved by a computer program for a user equipment associated with a communication system comprising a base station. The computer program comprises computer program code, which, when run on the user equipment, causes the user equipment to perform the steps of: receiving, from the base station during control channel reception, a downlink inactivity indicator, and disabling the receiving circuitry receiving circuitry, thus entering a power saving mode.

The object is according to an eight aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Briefly, in accordance with the invention, in transmission opportunities with no activity, the base station transmits a signal that indicates this fact. User equipment looks for this signal, and if it finds it, it turns off its reception circuitry until the next transmission opportunity.

Figure 1:
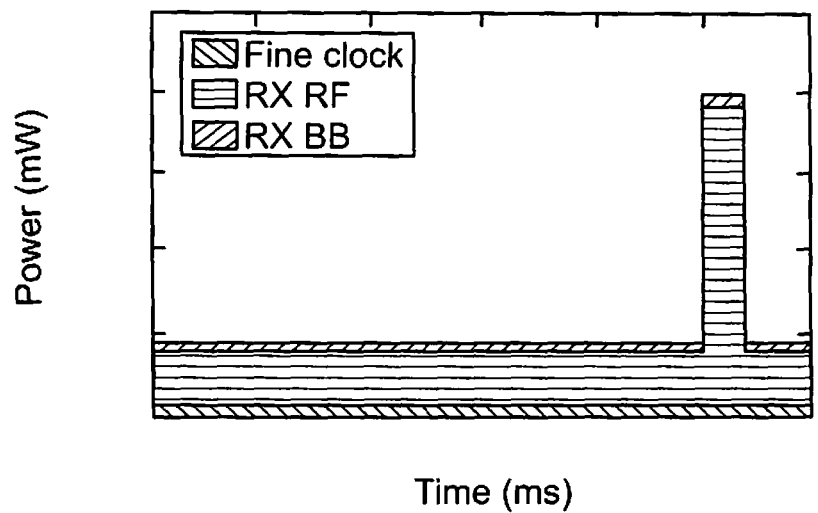
FIG. 1 illustrates an example of energy consumption of a terminal.
Figure 2:
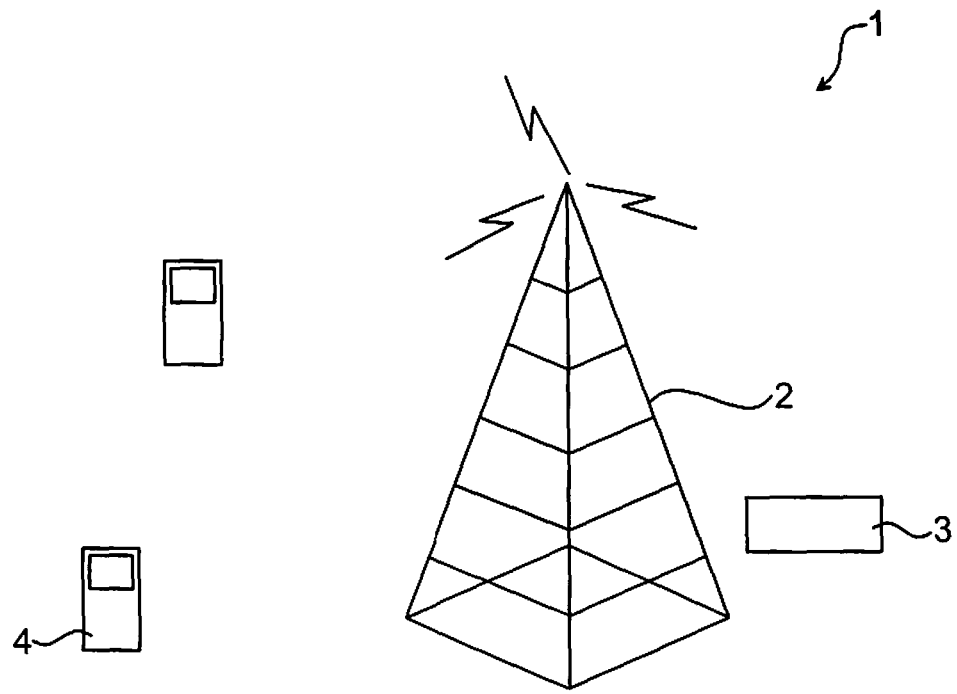
FIG. 2 illustrates schematically an environment in which embodiments of the invention may be implemented.

FIG. 2 illustrates schematically an environment in which embodiments of the invention may be implemented. In particular, a communication system 1 is illustrated comprising a base station 2, e.g. an evolved Node B or eNB in LTE, arranged to communicate with user equipment 4 using radio frequency transmitter(s) and receiver(s). The base station 2 may further comprise a scheduling device 3, also denoted scheduler, suitable for implementing methods of different embodiments of the invention. It is realized that the base station 2 comprises numerous further components, but only parts relevant for the present invention are illustrated and described.

The invention will now be described in relation to a communication system conforming to LTE. The invention can however be implemented in other communication systems as well, for example systems using WiMAX (Worldwide Interoperability for Microwave Access) protocol, or HSPA (High speed Packet Access), IEEE 802.11 (WLAN) or GPRS/EDGE (General Packet Radio Service/Enhanced Data-rates for Global Evolution).

In a first embodiment, an inactivity indicator is signaled by using the LTE downlink control channel called Physical Control Format Indicator Channel (PCFICH). It is transmitted once in each 1 ms subframe, and takes on values 1, 2, or 3. The PCFICH indicates the amount of resources allocated for control messages in that subframe. The PCFICH is designed to be robust and simple to receive.

It is also possible to transmit the value 0 (zero) over the PCFICH, but the 3GPP specifications does not define this value. In a first aspect of the invention, this fact is used in order to provide an inactivity indicator. In accordance with an embodiment thus, the base station 2 sets PCFICH to zero in subframes where there are no control or data messages transmitted.

The user equipment 4 can be designed so that when it receives a PCFICH value of zero it quickly turns off its receiving circuitry (also denoted radio frequency front end), thereby saving processing power for the remainder of the subframe.

A legacy terminal is typically not designed to receive the value zero on the PCFICH. If a the value zero is anyway transmitted, the terminal would likely either declare that particular subframe to be corrupt, or try and interpret it as if PCFICH had any of the allowed values 1, 2, or 3.

The described PCFICH embodiment is very simple to specify and implement, and provides energy savings even for legacy user equipment.

In a second embodiment, the inactivity indicator is signaled by using a new LTE control message (DCI) that is formatted in such a way that the user equipment can easily find it. For instance, some of the control channel elements (CCEs) on the PDCCH could be designated as preferred CCEs for such an inactivity message. The base station 2 would then transmit an inactivity message on these CCEs when there is no other transmission. The user equipment 4, when searching for control messages, would first look at those CCEs to see whether there is an inactivity message, in which case it could quickly turn off its receiving circuitry to save power.

This solution can be used to indicate inactivity for individual terminals, groups of terminals, or all terminals connected to the same cell. The search space scanned by a user equipment 4 is typically divided into a common search space and a terminal specific search space. In case no user equipment is scheduled an inactivity indicator is preferably transmitted in the common search space.

In case only a few users are active and there is spare capacity in the downlink control region then one or several user equipment specific inactivity indicators can be transmitted inside the user equipment specific search spaces to help these user equipment to reduce the power consumption. In case the communication system in which the methods are implemented allows it, it is possible to send dedicated inactivity indicators to all non-scheduled user equipment. The scheduler 3 (if methods implemented in such device) can choose to distribute the dedicated non-activity indicators in e.g. a round robin fashion. Alternatively the scheduler 3 can prioritize the energy consumption of specific terminals such as battery powered machine-to-machine devices or terminals associated with subscriptions paying extra for this energy saving feature.

The described PDCCH embodiments of the invention is somewhat more complex to specify compared to the PCFICH alternative, but has the additional advantage that it can save terminal processing power for inactive terminals, even in cases when there is other activity in the cell.

In the following a feature of PDCCH search space sorting of downlink inactivity indications is described. In the case of individual inactivity indicators there may still be contention between user equipment regarding the preferred CCEs. This could in principle be handled with a conventional blind decoding search within the set of preferred CCEs. However, in order to help the user equipment to quickly find their inactivity indicators, these messages may be sorted in a specific order, in such a way that each user equipment can infer a priori approximately in what part of the preferred CCE set the corresponding inactivity indicator is most likely to be located. To implement this use can be made of a source of common randomness between the base station 2 and the user equipment 4. One possibility is to use the user equipment ID number (known both to the user equipment 4 and the base station 2), after applying a suitable arithmetic operation such as computing the ID number modulo a fixed integer, say M. The result is approximately uniformly distributed between 0 and M−1. For M=10, this means retaining the last digit (in decimal representation). If two user equipment have the same ID number residual then the ordering in-between them may be determined at random or by resorting to some other criterion.

As an example of this sorting technique, suppose that it is desired to transmit inactivity messages to four user equipment with ID numbers 279, 122, 177, 525. Their last digits are 9, 2, 7 and 5. Consequently their inactivity messages will be sent in the order: 122, 525, 177, 279. The user equipment having ID 122 now knows that its last digit is 2 and therefore, it is very likely that its inactivity message will be found at the beginning of the preferred CCE set. Indeed, the chance that its message is located at the first spot is precisely the chance that (assuming four users, just for the sake of illustration) none of the other user equipment have an ID number ending with 0 or 1; this probability is $(8/10)^3 \approx 50\%$. So with 50% chance, user equipment 122 will find its location immediately. If it doesn't, then chances are very high that it will be located at the second spot. Similarly, user equipment 279 knows that with probability $(9/10)^3 \approx 73\%$ none of the other user equipment has an ID ending with 9 and therefore with 73% probability, it will find its inactivity message immediately if it looks at the last available place in the preferred CCE set. If not, the probability is very high that it is located very close to that point. Continuing this line of thought, user equipment 525, with ID ending with 5, knows that chances are high that its inactivity message is located in the middle of the preferred CCE set, or at a point not far from there, and so forth. Sophisticated search algorithms can be devised based on this supporting knowledge.

In additional, optional feature, note that if the user equipment knows approximately what the distribution of the index numbers looks like, then it can perform the search more efficiently. For example, if its own number is 5 and it does not know what the others' numbers are, then it would naturally start to look in the middle of the control region. By way of contrast, if the user equipment knew that the others had numbers 7, 8, 9, then it would instead start looking at the beginning. The other user equipment having numbers 7, 8, 9 is an unlikely event, of course, and that is why providing an indication of that event having occurred adds a substantial amount of information. Hence, it is realized that the search can be further sped up by the base station 2 broadcasting to the user equipment 4 information containing a statistical characterization of the indexes. This statistical characterization may comprise a histogram, or be obtained by vector quantization of a histogram of the values.

In general, since the user equipment is battery powered, energy in the user equipment is more valuable than energy in the network. However, in order to save energy in the base station 2 the inactivity indicators could be transmitted only when a user equipment 4 is in not in a discontinuous reception mode (DRX mode). If all user equipment in the cell are in DRX mode no one is anyway receiving the downlink control region.

By aligning the non-DRX time occasions of several user equipment, the base station 2 can reduce the time ratio when it needs to transmit inactivity indications.

It is also possible that the base station behavior depends on what type of power source it has. In case a solar powered base station is running low on battery backup power it may choose to disable the inactivity transmissions until the battery charge level improves.

Figure 3:
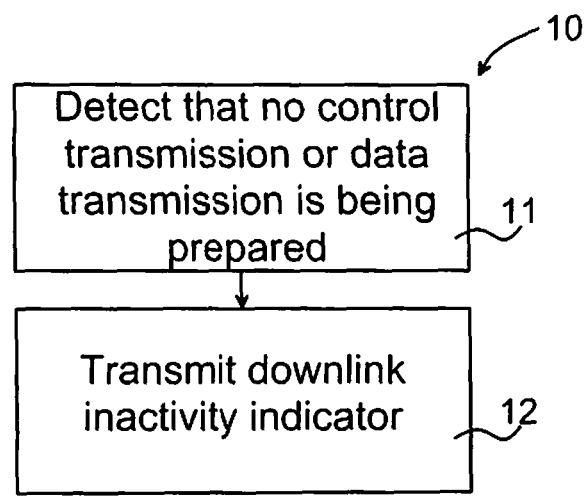
FIG. 3 illustrates a flow chart over steps of a method in a base station in an aspect of the invention.

FIG. 3 illustrates a flow chart over steps of a method in a base station in an aspect of the invention. The method 10 is implemented in the base station 2 of the communication system 1, for example in the scheduler 3 or in a separate device (not illustrated) that is in communication with the scheduler 3 and registering decisions of the scheduler in order to detect whether control transmission or data transmission is being prepared for a particular user equipment 4 or for groups of user equipment or for no user equipment at all within the communication system 1.

The method 10 comprises the first step of detecting 11 that no control transmission or data transmission is being prepared for the one or more user equipment 4. This can thus be performed by the scheduler or some other device, as described above.

The method 10 comprises the second step of transmitting 12 a downlink inactivity indicator to the one or more user equipment 4. The inactivity indicator is thus transmitted to the user equipment 4 for which it has been detected that no control or data transmission is due.

In an embodiment, the communication system 1 conforms to LTE standard, and the downlink inactivity indicator comprises Physical Control Format Indicator Channel (PCFIC) set to zero in sub-frames having no control data or user data.

As described earlier, no definition has been provided in the 3GPP specification for the use of zero for this channel.

In an alternative embodiment, wherein the communication system 1 again conforms to LTE standard, the downlink inactivity indicator is signaled by using a physical downlink control channel when no control data or user data is to be transmitted. As described earlier, some of the control channel elements (CCEs) on the PDCCH could be designated as preferred CCEs for the inactivity message.

In an embodiment, the downlink inactivity indicator is directed to individual user equipment, to one or more groups of user equipment or to all user equipment associated with the base station 2. Depending for example on the mode of the user equipment connected to the cell covered by the base station 2, or the settings of the scheduler 3, the downlink inactivity indicator may be sent to individual user equipment or to several user equipment.

In an embodiment, the step of detecting 11 comprises detecting that no user equipment 4 is scheduled for transmission, and the step of transmitting 12 comprises transmitting the downlink inactivity indicator in a common search space of downlink control channel elements within which the user equipment search for downlink control messages. If no user equipment 4 is active the downlink inactivity indicator is advantageously transmitted to all the user equipment in a way that enables them all to easily find the inactivity indicator, the common search space therefore being a suitable choice.

In an embodiment, the step of detecting 11 comprises detecting that a particular user equipment 4 is not scheduled for transmission, and the step of transmitting 12 comprises transmitting the downlink inactivity indicator in a user specific search space, within which the user equipment 4 searches for downlink control messages. If the activity of a single user equipment 4 is detected and found not have any transmission due, the inactivity indicator is preferably transmitted in resources in which the user equipment 4 would first search through for control messages, the user specific search space therefore being a suitable choice.

In an embodiment, the downlink inactivity indicator is transmitted at time occasions a: which the user equipment 4 is not in a discontinuous reception mode (DRX). The DRX mode of user equipment 4 is easily detected and when the user equipment 4 is in such mode, there is no need for the transmission of the downlink inactivity indicator as the user equipment 4 is not listening anyway.

Figure 4:
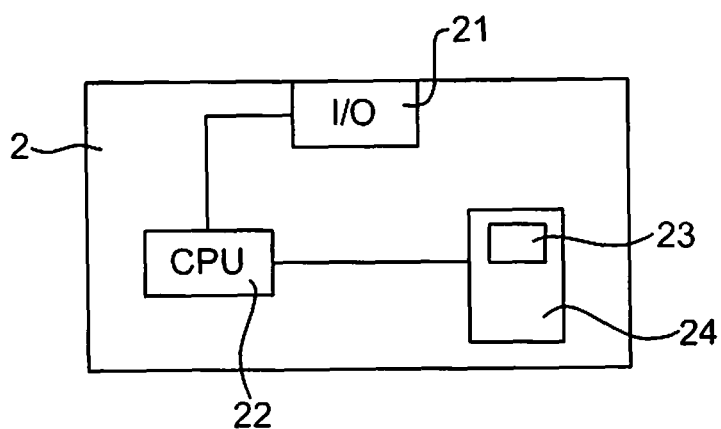
FIG. 4 illustrates means in a base station for implementing methods of FIG. 3.

The invention also encompasses the base station 2. FIG. 4 illustrates the base station 2 and in particular means for implementing the described methods. The base station 2 comprises a processor 22, e.g. a central processing unit, microcontroller, digital signal processor (DSP), etc., capable of executing software instructions stored in a computer program product 24 e.g. in the form of a memory. The processor 22 is connected to an input/output device 21, comprising or being connected to e.g a transmitter arranged to transmit data to user equipment 2. The input/output device 21 may also comprise or be connected to a receiver that receives signaling from the user equipment 4. It is noted that although only one processor 22 is illustrated in FIG. 4, the implementation may comprise distributed hardware so that several CPUs are used rather than one when running the software.

The described methods and algorithms or parts thereof for use in signaling inactivity indicators as described may be implemented e.g. by software and/or application specific integrated circuits in the processor 22. To this end, the base station 2 may further comprise a computer program 23 stored on a computer program product 24.

With reference still to FIG. 3, the invention also encompasses such computer program 23 for enabling the inactivity indicator transmission. The computer program 23 comprises computer program code which when run on the base station 2, and in particular the processor 22 thereof, causes the base station 2 to perform the methods as described.

A computer program product 24 is also provided comprising the computer program 23 and computer readable means on which the computer program 23 is stored. The computer program product 24 can be any combination of read and write memory (RAM) or read only memory (ROM). The computer program product 24 may also comprise persistent storage, which, for example can be any single one or combination of magnetic memory, optical memory, or solid state memory.

Figure 5:
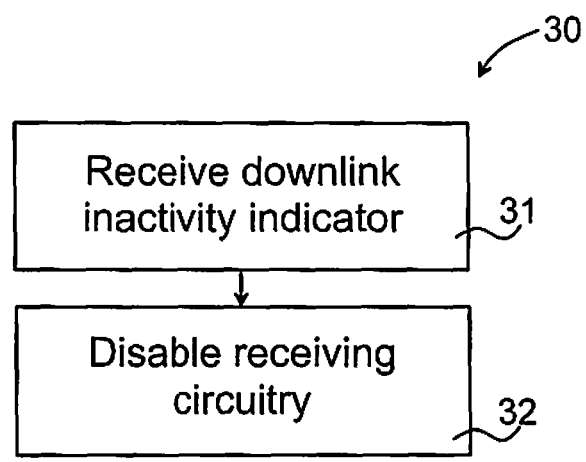
FIG. 5 illustrates a flow chart over steps of a method in a user equipment in an aspect of the invention.

FIG. 5 illustrates a flow chart over steps of a method in a user equipment 4 in an aspect of the invention. The method 30 is performed in the user equipment 4 associated with the communication system 1 and enables power saving. The term "associated with" is meant to describe user equipment 4 for use in a compatible communication system 1, the communication system 1 for example conforming to Long Term Evolution (LTE) standard and in the future any one of the 4G-standards according to International Telecommunication Union (ITU). The user equipment 4 comprises receiving circuitry 41. The method is performed during control channel reception, i.e. when the user equipment 4 is receiving a control channel, which e.g. for LTE is DCI transmitted over the PDCCH. The method 30 comprises the first step of receiving 31, from the base station 2, a downlink inactivity indicator.

The method 30 comprises the second step of disabling 32 the receiving circuitry 41, the user equipment 4 thus entering a power saving mode.

In an embodiment, the communication system 1 conforms to LTE standard, and the downlink inactivity indicator comprises Physical Control Format Indicator Channel (PCFICH) set to zero in sub-frames having no control data or user data. The use of PCFICH has been described earlier in the description.

In another embodiment, the communication system 1 conforms to LTE standard, and the downlink inactivity indicator received is a dedicated control channel element on a physical downlink control channel. Also the use of a physical downlink control channel, e.g. a dedicated control channel element on the physical downlink control channel, has been described earlier in the description.

In another embodiment, the step of receiving comprises the substep of searching for the downlink inactivity indicator in a common search space of downlink control channel elements within which the user equipment 4 searches for downlink control messages. In another embodiment, the step of receiving comprises the substep of searching for the downlink inactivity indicator in a user specific search space, within which the user equipment 4 searches for downlink control messages. The search by the user equipment for inactivity messages can thus be performed in different ways, and it is noted that the search e.g. within the user specific search space can be refined, e.g. in accordance with the search space sorting as described earlier.

Figure 6:
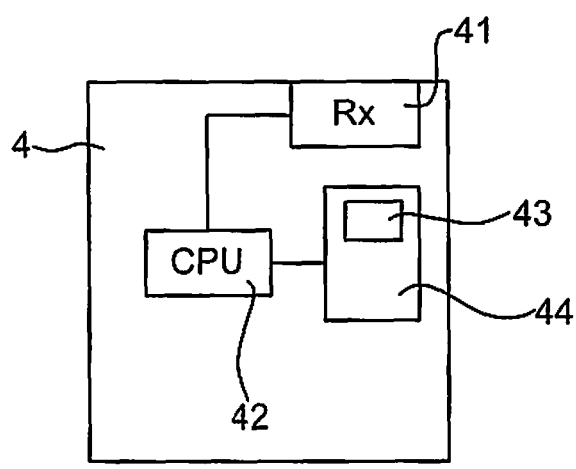
FIG. 6 illustrates means in a user equipment for implementing methods of FIG. 5.

FIG. 6 illustrates means in the user equipment 4 for implementing methods of FIG. 5. In particular, the user equipment 4 comprises receiving circuitry 41 arranged to receive, from the base station 2, a downlink inactivity indicator. In a radio receiver circuit, the RF front end is a generic term for all the circuitry between the antenna and the first intermediate frequency (IF) stage. It consists of all the components in the receiver that process the signal at the original incoming radio frequency (RF), before it is converted to a lower intermediate frequency (IF). The receiving circuitry 41 may comprise any such circuits or combination of circuits.

The user equipment 4 further comprises a controller 42 arranged to disable, upon reception of such downlink inactivity indicator, the receiving circuitry 41, the user equipment 4 thus entering a power saving mode.

The described methods and algorithms or parts thereof for use in signaling inactivity indicators as described may be implemented e.g. by software and/or application specific integrated circuits in the processor 42. To this end, the user equipment 4 may further comprise a computer program 43 stored on a computer program product 44.

With reference still to FIG. 6, the invention also encompasses such computer program 43 for enabling the inactivity indicator transmission. The computer program 43 comprises computer program code which when run on the user equipment 4, and in particular the processor 42 thereof, causes the user equipment 4 to perform the methods as described.

A computer program product 44 is also provided comprising the computer program 43 and computer readable means on which the computer program 43 is stored. The computer program product 44 can be any combination of read and write memory (RAM) or read only memory (ROM). The computer program product 44 may also comprise persistent storage, which, for example can be any single one or combination of magnetic memory, optical memory, or solid state memory.

Figure 7:
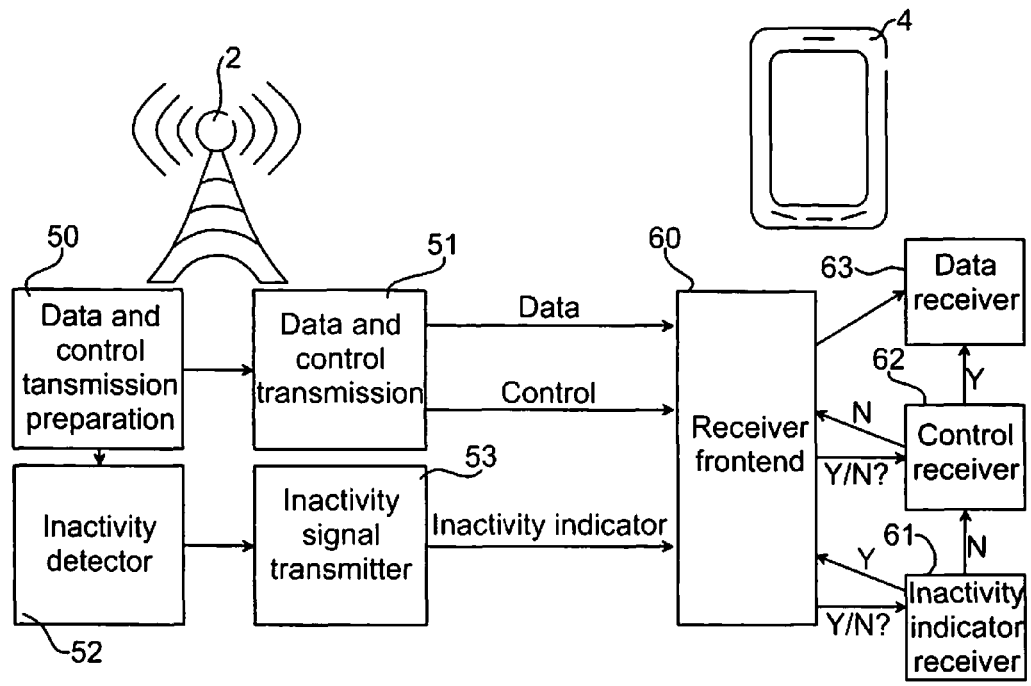
FIG. 7 is another illustration of methods in accordance with aspects of the invention in the base station and in the user equipment.

FIG. 7 is another illustration of aspects of the invention for the base station 2 and in the user equipment 4. At box 50, the base station 2 monitors the transmission preparations in order to detect when there is no transmission being prepared (to one or more user equipment). If there is data and control transmission eminent, box 51, such transmission is sent (arrows denoted Data and Control, respectively). If there is no transmission due, then, at box 52, the inactivity indicator is transmitted, e.g. by an inactivity signal transmitter 53 (or the previously described input/output device 21, comprising or being connected to a transmitter arranged to transmit data to user equipment 2). The inactivity indicator is thus transmitted to the user equipment 2 (arrow indicated with Inactivity indicator).

In the user equipment 2, and in particular a receiver frontend thereof (box 60) the transmission is received. The earlier mentioned receiving circuitry 41 could comprise this receiver frontend. An inactivity indicator receiver 61, e.g. a software implementation in a base band program, determines whether such an inactivity indicator has been received. If yes, then the receiver frontend 60 is turned off and a control receiver 62 is informed. It is noted that it might still be necessary for the control receiver 62 to continue to search for control information related to uplink transmissions. If no inactivity indicator is received, the receiver frontend 60 continues receiving, buffering and processing the received data. A data receiver 63 is enabled only when there is data to receive.

Figure 8:
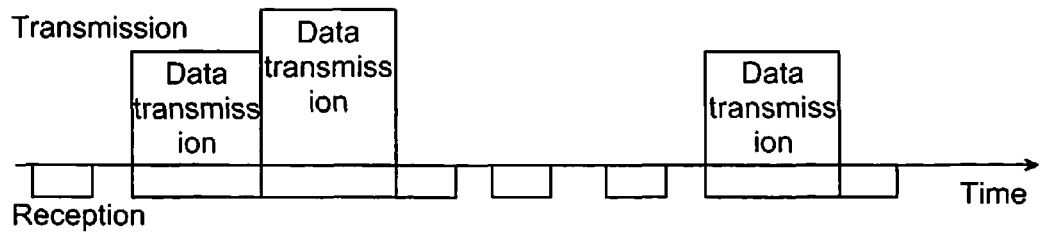
FIGS. 8 and 9 illustrate downlink activity and reception processing for state of the art and for when implementing aspects of the invention, respectively.
Figure 9:
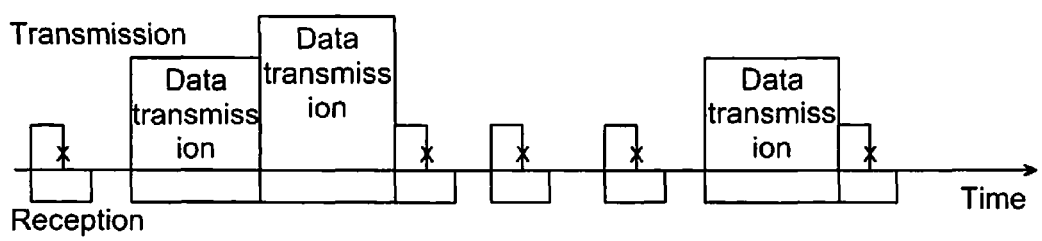

FIGS. 8 and 9 illustrate downlink activity and reception processing for state of the art and for when implementing aspects of the invention, respectively. FIG. 8 illustrates state of the art, and in particular, the downlink activity from a base station is indicated by the rectangles above the timeline, while the reception processing in the user equipment is indicated by the rectangles below the timeline. As shown, the user equipment needs to perform a lot of unnecessary processing even then there is no transmission due for it. FIG. 9 is a corresponding illustration for the present invention: when there is no downlink activity, the base station transmits an inactivity signal, indicated at x. This enables the user equipment to reduce the reception processing when there is no transmission due for it. The reduced processing gives a prolonged battery life time.

The invention claimed is:

1. A method, in a base station of a communication system, the communication system also comprising one or more user equipment, the method comprising:
   detecting that no control transmission or data transmission is being prepared for the one or more user equipment;
   transmitting a downlink inactivity indicator to the one or more user equipment, in response to the detecting;
   wherein the communication system conforms to a LTE standard;
   wherein the downlink inactivity indicator comprises Physical Control Format Indicator Channel set to zero in sub-frames having no control data or user data.

2. The method of claim 1, wherein the downlink inactivity indicator is directed to all user equipment associated with the base station.

3. The method of claim 1, wherein:
   the detecting comprises detecting that no user equipment is scheduled for transmission;
   the transmitting comprises transmitting the downlink inactivity indicator in a common search space of downlink control channel elements within which the user equipment search for downlink control messages.

4. The method of claim 1, wherein:
   the detecting comprises detecting that a particular user equipment is not scheduled for transmission;
   the transmitting comprises transmitting the downlink inactivity indicator in a user specific search space, within which the particular user equipment searches for downlink control messages.

5. The method of claim 1, wherein the downlink inactivity indicator is transmitted at time occasions at which the user equipment is not in a discontinuous reception mode.

6. A base station of a communication system, the communications system also comprising one or more user equipment, the base station comprising:
   a control circuit configured to detect that no control transmission or data transmission is being prepared for the one or more user equipment;
   a transmitter configured to transmit a downlink inactivity indicator in response to the control circuit detecting that no control transmission or data transmission is being prepared,
   wherein the communication system conforms to a LTE standard;
   wherein the downlink inactivity indicator comprises Physical Control Format Indicator Channel set to zero in sub-frames having no control data or user data.

7. A computer program stored in a non-transitory computer readable medium for controlling a base station of a communication system, wherein the communication system conforms to a LTE standard, the communication system also comprising one or more user equipment, the computer program comprising computer program code, which, when run on one or more processing circuits of the base station, causes the base station to:
   detect that no control transmission or data transmission is being prepared for the one or more user equipment;
   transmit a downlink inactivity indicator to the one or more user equipment in response to detecting that no control transmission or data transmission is being prepared for the one or more user equipment;

wherein the downlink inactivity indicator comprises Physical Control Format Indicator Channel set to zero in sub-frames having no control data or user data.

8. A method, performed in a user equipment associated with a communication system, for enabling power saving, the user equipment comprising receiving circuitry, the method being performed during control channel reception and comprising:

receiving a downlink inactivity indicator from a base station;

disabling the receiving circuitry, in response to receiving the inactivity indicator, thereby entering a power saving mode;

wherein the communication system conforms to a LTE standard;

wherein the downlink inactivity indicator comprises Physical Control Format Indicator Channel set to zero in sub-frames having no control data or user data.

9. The method of claim 8, wherein the receiving comprises searching for the downlink inactivity indicator in a common search space of downlink control channel elements within which the user equipment search for downlink control messages.

10. The method of claim 8, wherein the receiving comprises searching for the downlink inactivity indicator in a user specific search space, within which the user equipment searches for downlink control messages.

11. A user equipment associated with a communication system, wherein the communication system conforms to a LTE standard, the user equipment comprising:

receiving circuitry configured to receive, from a base station and during control channel reception, a downlink inactivity indicator;

control circuitry configured to disable, in response to reception of the downlink inactivity indicator, the receiving circuitry, thereby causing the user equipment to enter a power saving mode;

wherein the downlink inactivity indicator comprises Physical Control Format Indicator Channel set to zero in sub-frames having no control data or user data.

12. A computer program stored in a non-transitory computer readable medium for controlling a user equipment associated with a communication system, wherein the communication system conforms to a LTE standard, the communication system also comprising a base station, the computer program comprising computer program code, which, when run on one or more processing circuits of the user equipment, causes the user equipment to:

receive a downlink inactivity indicator from the base station during control channel reception;

disabling the receiving circuitry in response to receiving the inactivity indicator, thereby causing the user equipment to enter a power saving mode;

wherein the downlink inactivity indicator comprises Physical Control Format Indicator Channel set to zero in sub-frames having no control data or user data.

* * * * *

UNITED STATES PATENT AND TRADEMARK OFFICE
CERTIFICATE OF CORRECTION

| | |
|---|---|
| PATENT NO. | : 9,301,251 B2 |
| APPLICATION NO. | : 14/130515 |
| DATED | : March 29, 2016 |
| INVENTOR(S) | : Eriksson et al. |

It is certified that error appears in the above-identified patent and that said Letters Patent is hereby corrected as shown below:

On the Title Page, in Item (56), under "OTHER PUBLICATIONS", in Column 2, Line 2, delete "IEE" and insert -- IEEE --, therefor.

Drawings

In Fig. 7, Sheet 4 of 4, in Box "50", Line 3, delete "tansmission" and insert -- transmission --, therefor.

Specification

In Column 2, Line 14, delete "front-tend" and insert -- front-end --, therefor.

In Column 7, Line 56, delete "equipment 2." and insert -- equipment 4. --, therefor.

In Column 8, Line 11, delete "(RAM)" and insert -- (RWM) --, therefor.

In Column 9, Line 24, delete "(RAM)" and insert -- (RWM) --, therefor.

In Column 9, Line 40, delete "equipment 2)." and insert -- equipment 4). --, therefor.

In Column 9, Line 41, delete "equipment 2" and insert -- equipment 4 --, therefor.

In Column 9, Line 43, delete "equipment 2," and insert -- equipment 4, --, therefor.

Claims

In Column 10, Line 48, in Claim 6, delete "prepared," and insert -- prepared; --, therefor.

Signed and Sealed this
Nineteenth Day of July, 2016

Michelle K. Lee
*Director of the United States Patent and Trademark Office*